United States Patent [19]

Gandrud

[11] Patent Number: 4,987,433
[45] Date of Patent: Jan. 22, 1991

[54] RING AND POINT STROBE

[76] Inventor: S. Garfield Gandrud, 414 Baywood Dr., Newport Beach, Calif. 92660

[21] Appl. No.: 444,420

[22] Filed: Dec. 1, 1989

[51] Int. Cl.$^5$ .............................................. G03B 15/05
[52] U.S. Cl. .................................. 354/132; 354/145.1
[58] Field of Search ............................ 354/132, 145.1

[56] References Cited

U.S. PATENT DOCUMENTS 4,816,854  3/1989  Tsuji et al. .................... 354/132 X
4,887,106  12/1989  Cooper, Jr. .................... 354/132 X

*Primary Examiner*—Michael L. Gellner
*Attorney, Agent, or Firm*—Roy A. Ekstrand

[57] ABSTRACT

A ring and point strobe includes a ring strobe and a support housing to secure the ring strobe to the end portion of a camera lens. A support bracket is movably secured to the strobe unit and supports a point source strobe. A detent mechanism is coupled between the movable bracket and the remainder of the strobe unit to permit the point source strobe to be positioned in a plurality of detented angular positions.

7 Claims, 3 Drawing Sheets

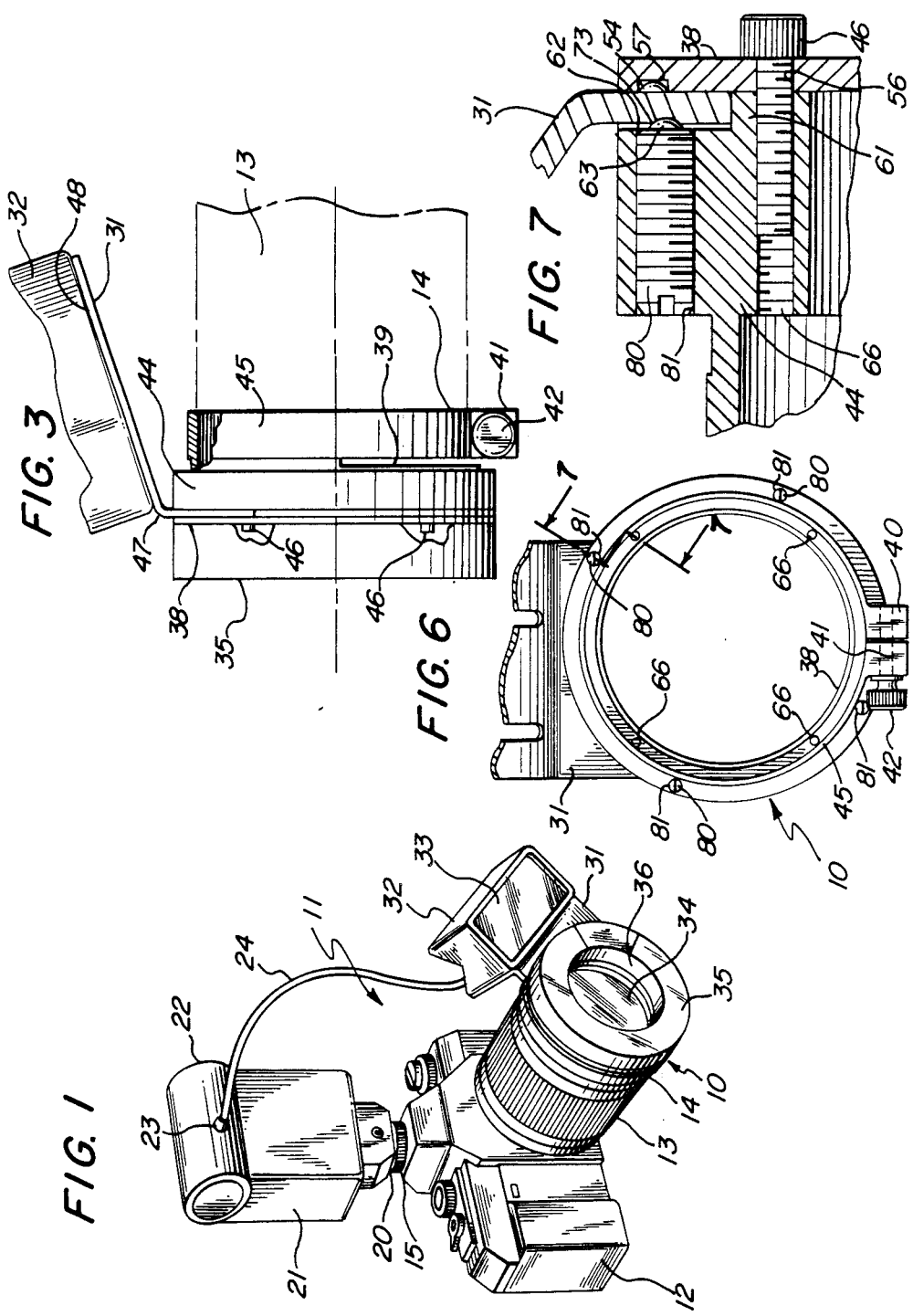

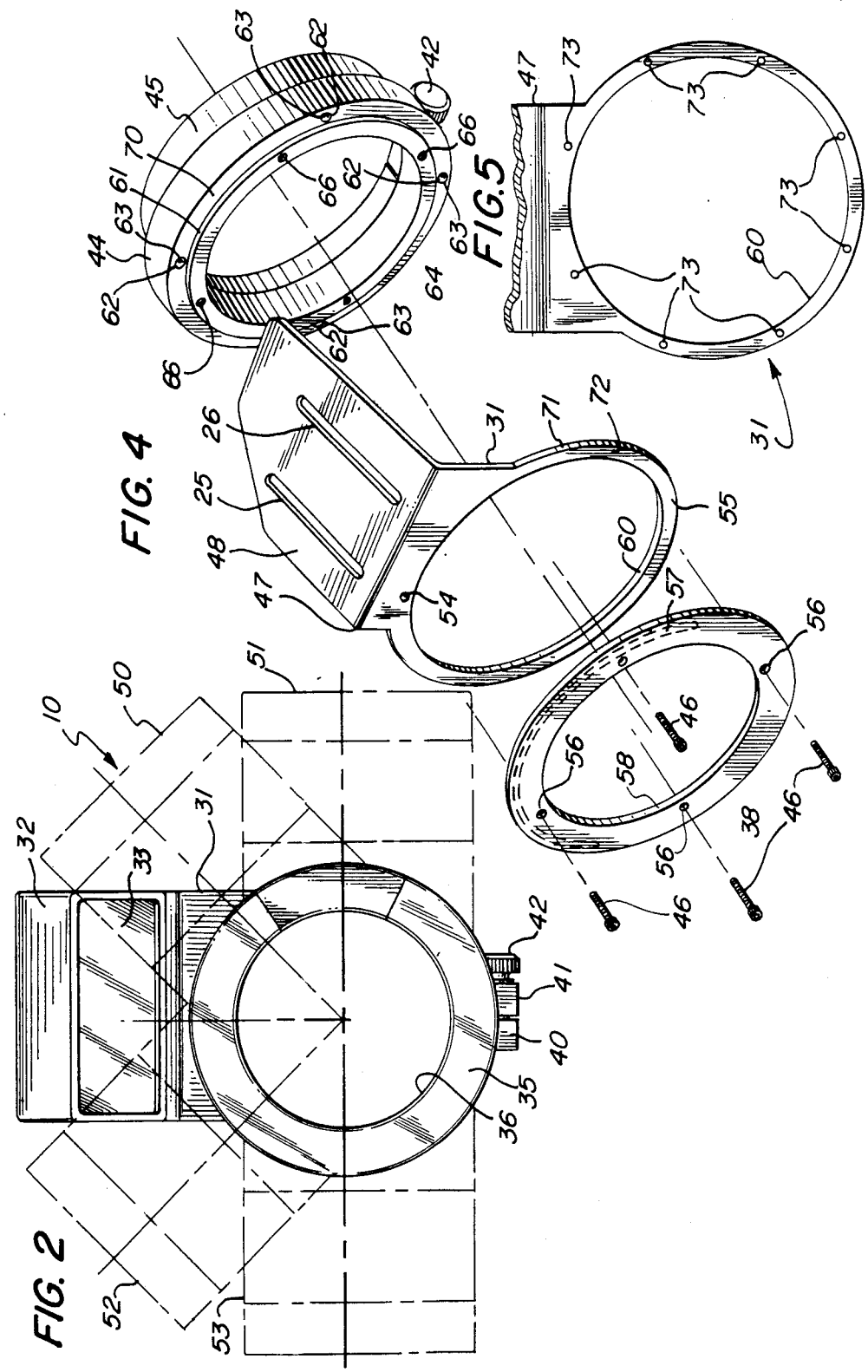

RING AND POINT STROBE

FIELD OF THE INVENTION

This invention relates generally to strobe or flash Photography and particularly to photography used in close up imaging of small objects close to the camera lens.

BACKGROUND OF THE INVENTION

In a wide variety of photographic operations, a need arises to utilize extended magnifications and image objects which are extremely close to the front portion of the camera lens. One of the most common areas of photography in which this need arises is that used in the medical arts for providing high magnification photos of tissue structure and dental appliances as well as tooth and jaw structure. Because such photography requires a substantial amount of light and because it is often desirable to utilize flash or strobe photography due to the discomfort caused to the patient by continuous lighting apparatus, the majority of such photography is carried forward using the newly developed short duration electronic strobe units.

The use of strobe units in extreme close up high magnification photography presents some difficulties, however, which are not encountered in normal strobe photography. One of the difficulties that arises is the problems in properly orienting the strobe unit with respect to the to-be-photographed object. Another problem arises in that the highly directed light energy from an electronic strobe unit produces substantial shadowing of the to-be-imaged object.

These problems have been addressed by practitioners in the art through the development of a number of different strobe units and support systems or combinations of strobes specifically adapted to high magnification close in photography.

U.S. Pat. No. 4,145,134 issued to Kogure et al. sets forth a DEVICE FOR MOUNTING ELECTRONIC FLASH ON CAMERA. U.S. Pat. Des. No. 250,766 issued to Ozawa sets forth a STROBOFLASH. These patents are exemplary of conventional strobe units and their mounting and attachment to cameras.

U.S. Pat. No. 4,392,183 issued to Ostlund et al. sets forth a DEVICE IN CONNECTION WITH CAMERAS in which a support bracket suitable for attachment to the end portion of a camera lens includes a pair of pivotally mounted outwardly extending strobe support units. A pair of strobe units are operatively supported upon the pivotal members by a second pivotal attachment. The pivotal axes supporting each of the strobe units permit the movement and direction of the strobe independently.

U.S. Pat. No. 2,682,603 issued to Dine et al. sets forth a PORTABLE PHOTOGRAPHIC LIGHT UNIT in which a ring type flash unit is adapted to be received upon and encircle the end portion of a camera lens. A connecting plug and cable are coupled to the ring flash to permit the strobe to be coupled to a conventional flash bulb socket. The flash unit then fires the ring strobe to provide an encircling light source about the end of the camera lens.

U.S. Pat. No. 4,423,470 issued to Naito et al. sets forth a LENS BARREL SUITABLE FOR FLASH PHOTOGRAPHY in which a light intercepting member is integrally provided within the lens for intercepting a portion of the light emitted from the strobe device for use by the camera system.

U.S. Pat. No. 4,298,907 issued to Holt, Jr. sets forth a FLASH ATTACHMENT WITH EXTENDABLE HEAD in which a flash unit for a hand held camera includes a flash head pivotally mounted upon an extendable member supported by the main flash unit. A plurality of modular auxiliary units are also provided to produce a plurality of flash heads.

U.S. Pat. No. 3,367,253 issued to Kuhns et al. sets forth a MULTIPLE IMAGE FLASH CAMERA in which an extended ring flash unit is sized and adapted to encircle the plural lens elements of a multiple image flash camera.

A strobe unit manufactured and sold by Lester A. Dine, Inc. having a model number DINE105MM Macro provides a combination of a ring flash and an associated point source flash together with an automatic exposure control.

While the foregoing units provide substantial improvement in the performance of strobe units in high magnification photography, there remains a continuing need for further improved strobe units.

SUMMARY OF THE INVENTION

Accordingly, it is a general object of the present invention to provide an improved ring and point strobe flash system for close up high magnification photography. It is a more particular object of the present invention to provide an improved ring and point strobe system in which the relative positions of the ring and point strobe light sources may be more reliably positioned.

In accordance with the present invention, there if provided for use in combination with a camera having a lens defining a lens opening and shutter means for triggering a strobe unit, a ring and point strobe comprises: a detent housing having clamp means for attachment to a camera lens; a ring strobe bulb supported upon the detent housing and encircling at least a portion of the lens opening; a point source strobe bulb; a support bracket, received upon the detent housing, supporting the point source strobe bulb; and detent means coupled between the support bracket and the detent housing operative to detentably position the support bracket at a plurality of distinct angular positions about the ring strobe bulb.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a ring and point strobe supported upon a typical camera in accordance with the present invention;

FIG. 2 sets forth a frontal view of a ring and point strobe constructed in accordance with the present invention;

FIG. 3 sets forth a side view of a ring and point strobe constructed in accordance with the present invention;

FIG. 4 sets forth a perspective assembly view of a ring and point strobe support constructed in accordance with the present invention;

FIG. 5 sets forth a partially sectioned view of a portion of the ring and point support constructed in accordance with the present invention;

FIG. 6 sets forth a partial section view of a portion of the present invention ring and point strobe;

FIG. 7 sets forth a partial section view of a portion of the present invention ring and point strobe taken along section lines 7—7 in FIG. 6.

DESCRIPTION OF THE PREFERRED EMBODIMENT

Figure 8:
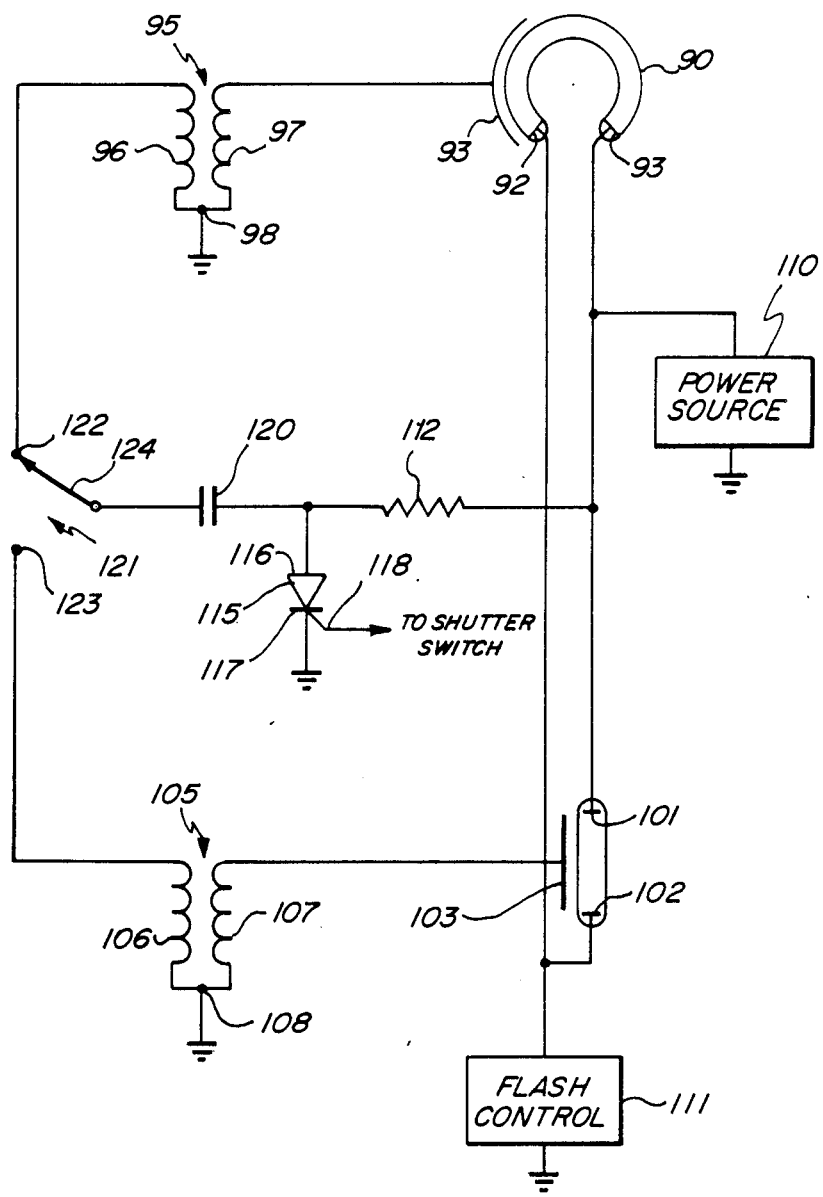
FIG. 8 sets forth a partial schematic partial block diagram of the electronic circuit of the present invention ring and point strobe.

FIG. 1 sets forth a perspective view of a typical camera generally referenced by numeral 11 and a strobe unit constructed in accordance with the present invention and generally referenced by numeral 10. Camera 11 includes a conventional camera body 12 which includes a connecting plate 15 of the type often referred to as a "hot shoe" connector. A generally cylindrical lens 13 is coupled to camera body 12 in accordance with conventional fabrication techniques and defines a lens end portion 14 which in turn supports a lens front 34. Camera 11 and lens 13 are constructed in accordance with conventional fabrication techniques and it will be apparent to those skilled in the art that the present invention ring and point strobe may be used with other cameras in different configurations without departing from the spirit and scope of the present invention.

Strobe unit 10 includes a support bracket 31 preferably formed of a rigid material such as steel or the like, the details of which are set forth below in greater detail. Suffice it to here that support bracket 31 is secured by means set forth below to lens end 14 in a manner permitting support bracket 31 to be detentably rotated about lens end 14. Support bracket 31 in turn supports a point source strobe unit 32 having a generally planar output lens 33. A ring source strobe element 35 is supported upon and coupled to support bracket 31 by means set forth below in greater detail. Ring source 35 defines a center aperture 36 which is generally concentric with lens front element 34 whereby light from the photographed image is permitted to pass through aperture 36 and be received within lens 14.

A strobe power unit 21, the structure of which is set forth below in greater detail, is supported upon and coupled to hot shoe 15 by a connector 20. Power unit 21 further includes an upper portion 22 which supports a grommet 23. A cable 24 passes through grommet 23 to point source 32 and ring source 35 in the manner set forth below in greater detail.

In operation, camera body 12 and lens 13 are positioned such that the to-be-photographed object is appropriately oriented with respect to lens 13. Thereafter, lens 13 is focused in accordance with conventional fabrication techniques. Power unit 21 includes an internal battery power system (not shown) which in accordance with conventional fabrication techniques provides an operative source of electrical energy for power unit 21. Power unit 21 further includes a DC to DC converter which raises the battery power to a sufficient DC voltage to fire either point source 32 or ring source 35. The high firing voltage provided by power unit 21 is coupled alternatively to point source 32 or ring source 35 via cable 24 in accordance with the connection shown in FIG. 8. A selector switch (seen in FIG. 8) is supported upon point source 32 and is operative to direct the firing voltage to either point source 32 or ring source 35 as required.

With the object focused and oriented with respect to lens 13 and with power unit 21 properly energized, the operation of the shutter mechanism (not shown) within camera 11 causes either point source 32 or ring source 35 to be energized producing an output short duration high energy like pulse which is directed to the to-be-photographed object and which is reflected therefrom through lens front 34 and into camera 11 to complete the photographic process.

In accordance with an important aspect of the present invention, the relative position of point source 32 with respect to lens front 34 and ring source 35 may be adjusted through a plurality of detented angular positions (better seen in FIG. 2) to properly position point source 32 and illuminate the to-be-photographed object.

FIG. 2 sets forth a front view of strobe unit 10 removed from camera 11. As described above, strobe unit 10 includes a support bracket 31 which is secured to and supports ring source 35. As is set forth below in FIG. 8, strobe unit 10 includes a clamp ring 45 and a detent housing 44 which are utilized in securing support bracket 31 to lens 13. Clamp ring 45 further defines a pair of downwardly extending flanges 40 and 41 which receive a clamp screw 42. As will be set forth below in greater detail, clamp screw 42, flanges 40 and 41, and clamp ring 45 cooperate to secure strobe unit 10 to lens 13. As is also set forth above, support bracket 31 supports a point source 32 which in turn includes a generally planar lens 33. In accordance with the detent positioning mechanism of the present invention, support bracket 31 may be positioned in a plurality of angular positions shown in dashed line representation as angular positions 50 and 51 on one side of the vertical position shown and in angular positions 52 and 53 on the other side of the vertical position. Thus, point source 32 may be positioned in a selected one of a plurality of detent positions through a full one hundred and eighty degree range.

FIG. 3 sets forth a side view of strobe unit 10. As described above, strobe unit 10 includes a generally cylindrical annular detent housing 44 to which a support bracket 31 is detentably attached by means set forth below. A generally annular front plate 38 is secured to detent housing 44 by a plurality of fasteners 46 in an attachment which captivates support bracket 31 between front plate 38 and detent housing 44. Support bracket 31 further defines a bend line 47 together with an angled plate 48. Angled plate 48 further supports a point source strobe unit 32 in the manner set forth above. A ring source 35 set forth above is secured to front plate 38 by use of conventional fastening means. Strobe unit 10 further includes an annular clamp ring 45 coupled to detent housing 44 through a portion of its circumference and separated therefrom through the remaining portion of its circumference by a slot 39. As mentioned above, clamp ring 45 defines a pair of downwardly extending flanges 40 and 41 (the former better seen in FIG. 2). A clamp screw 42 extends through flange 41 and is threadably received within flange 40. Lens 13 defines a cylindrical lens end 14 which extends into and is received by clamp ring 45. Thereafter, clamp screw 42 is tightened drawing flanges 40 and 41 together and closing clamp ring 45 upon lens end 40 to securely attach strobe unit 10 to lens 13. Thus, it will be apparent to those skilled in the art that strobe unit 10 may be attached to and removed from lens 13 without any alteration of the lens.

FIG. 4 sets forth a perspective assembly view of strobe unit 10 with ring source 35 and point source 32 removed. Detent housing 44 comprises a generally cylindrical annular member supporting a clamp ring 45 which in turn supports a clamp screw 42. Detent housing 44 further defines an annular surface 70 defining a plurality of apertures 62 therein. By means set forth below in greater detail, detent housing 44 supports a plurality of detent mechanisms which include a plurality of spherical detent balls 63 which are captivated within housing 44 and extend outwardly beyond surface 70 through apertures 62. Detent housing 44 further defines an annular rim 61 having a planar surface 64 and defining a plurality of threaded apertures 66.

A support bracket 31 includes an annular portion 55 having surfaces 71 and 72 on either side thereof and defining a center aperture 60. A projection 54 extends outwardly from support bracket 31 adjacent aperture 60 and beyond surface 72. Support bracket 31 further defines a bend line 47 and an angled plate 48. Angled plate 48 in turn defines a pair of generally parallel slots 25 and 26. A front plate 38 defines a generally planar annular member having a plurality of apertures 56 extending therethrough. Front plate 38 further defines a generally planar surface 58 and a curved slot 57 extending inwardly therefrom. Apertures 56 are spaced about front plate 38 to correspond to the spacing of apertures 66 in annular rim 61 of detent housing 44. A plurality of fasteners 46 extend through apertures 56 and are threadably received within threaded apertures 66 of annular rim 61.

With temporary reference to FIG. 5, it can be seen that support bracket 31 further defines a plurality of detent recesses 73 extending inwardly from surface 71 of annular portion 55. In accordance with the invention, detent recesses 73 are sized and configured to operatively receive detent balls 63 as they extend through apertures 62.

Returning to FIG. 4, support bracket 31 is assembled to detent housing 44 by passing annular rim 61 through aperture 60 bringing surface 71 of bracket 31 against surface 70 of detent housing 44. Thereafter, front plate 38 is positioned against surface 64 of annular rim 61 and apertures 56 and 66 are aligned by rotating front plate 38. Finally, fasteners 46 are passed through apertures 56 and threadably received within threaded apertures 66. Thus, support bracket 31 is received upon annular rim 61 and is captivated between surface 70 of detent housing 44 and surface 58 of front plate 38. In accordance with this assembly and as described below in greater detail, the angular position of support bracket 31 is maintained in a selected one of the plurality of detent positions available by the cooperation of detent balls 63 and detent recesses 73. In addition, the assembly of front plate 38 to detent housing 44 causes projection 54 to extend into and be received within curved slot 57 of front plate 38. Because slot 57 is approximately one-half of the circumference of front plate 38, projection 54 cooperates with slot 57 to limit the angular movement of bracket 31 with respect to front plate 38 and detent housing 44.

FIG. 6 sets forth a partially sectioned view of strobe unit 10. Detent housing 44 defines a plurality of threaded apertures 81 which receive a corresponding plurality of threaded detent carriers 80. The structure of detent carriers 80 is better seen in FIG. 7. However, suffice it to note here that threaded carriers 80 support and captivate detent balls 63 within detent housing 44 as shown above in FIG. 4. Detent housing 44 further supports annular clamp ring 45 which in turn defines a pair of downwardly extending flanges 40 and 41. A clamp screw 42 is threadably received within flange 40 and is operative to close clamp ring 44 upon lens 13 (seen in FIG. 3). Support bracket 31 is captivated between front plate 38 and detent housing 44 as described above.

FIG. 7 sets forth a partial section view of strobe unit 10 taken along section lines 7—7 in FIG. 6. It should be noted that the structure shown in FIG. 7 is typical of the corresponding structures repeated about the periphery of strobe unit 10. Accordingly, detent housing 44 defines a threaded aperture 66 and a threaded aperture 81. A threaded detent carrier 80 supports a detent ball 63 in a spring force attachment in accordance with conventional fabrication techniques in which ball 63 is urged outwardly by a captive spring within detent carrier 80 (not shown) and in accordance with which detent ball 63 may be forced inwardly to the interior of detent carrier 80. Detent carrier 80 is threadably received within aperture 81 and extends to the corresponding oppositely facing aperture 62 by a depth which is adjustable in accordance with the threaded position of detent carrier 80. Detent housing 44 further defines an annular rim 61 which receives support bracket 31 such that detent recess 73 within support bracket 31 may receive detent ball 63 for a detent engagement. A front plate 38 defines an aperture 56 aligned with aperture 66 and a fastener 46 extends through aperture 56 and is threadably received within aperture 66 to securely attach front plate 38 to detent housing 44 and captivate support bracket 31. Support bracket 31 further defines an outwardly extending projection 54 while front plate 38 defines a curved slot 57. Slot 57 receives projection 54 and the cooperation thereof limits the annular rotation of support bracket 31 with respect to detent housing 44.

FIG. 8 sets forth a partial schematic partial block diagram of the electronic portion of the present invention ring and point strobe. A power source 110 includes conventional circuitry for converting an internal battery power source (not shown) to a higher DC voltage suitable for energizing the strobe bulbs of the present invention strobe unit. A ring bulb 90 includes a generally circular bulb envelope supporting a pair of electrodes 91 and 92. A trigger electrode 93 is positioned close to ring bulb 90. A trigger transformer 95 includes a primary winding 96 and a secondary winding 97 commonly coupled to form a junction 98. Junction 98 is coupled to ground while secondary 97 is coupled to trigger electrode 93 of ring bulb 90.

A point source strobe bulb 100 includes a glass envelope supporting a pair of electrodes 101 and 102 therein. A trigger electrode 103 is supported close to point source bulb 100. A trigger transformer 105 includes a primary winding 106 and a secondary winding 107. A junction 108 is commonly coupled to primary winding 106 and secondary winding 107 and is further coupled to ground. Secondary winding 107 is coupled to trigger electrode 103.

A switch 121 includes a pair of contacts 122 and 123 coupled to primary windings 96 and 106 respectively and a movable contact 124. Movable contact 124 is selectively couplable to contact 122 or 123. A series combination of a capacitor 120 and a resistor 112 are coupled between power source 110 and movable contact 124 of switch 121. An SCR diode 115 includes an anode electrode 116 coupled to the junction of resistor 112 and capacitor 120 and a cathode electrode 117 coupled to ground and a trigger electrode 118. Electrodes 91 and 101 of strobe bulbs 90 and 100 respectively are coupled to power source 110. Electrodes 92 and 102 of strobe bulbs 90 and 100 are commonly coupled to a flash control 111 which in turn is coupled to ground.

In operation, power source 110 produces a high DC voltage which is maintained at electrodes 91 and 101 of bulbs 90 and 100 respectively. Switch 121 is set in the configuration shown in FIG. 8 to provide a coupling between capacitor 120 and primary winding 96 of transformer 95. Thus in the position shown, switch 121 is positioned in correspondence to the selection of the operation of ring bulb 90. The high DC voltage produced by power source 110 is coupled by resistor 112 to capacitor 120 causing it to charge to a voltage corresponding generally to the output voltage of power source 110. In the absence of a triggering signal to trigger electrode 118, SCR 115 remains nonconductive and capacitor 120 remains charged. Similarly, in the absence of current through primary winding 96, no triggering voltage is produced at trigger electrode 93. Thus, the system is configured to fire bulb 90 and requires only that an appropriate trigger signal be applied to electrode 118 through the operation of the shutter switch within camera 11 (seen in FIG. 1). Upon the operation of the shutter of camera 11, a trigger signal is applied to trigger electrode 18 causing SCR 115 to conduct which in turn causes a rapid discharge of capacitor 120. The rapid discharge of capacitor 120 in turn causes a pulse of electrical current to be produced within primary winding 96. The transformer coupling of transformer 95 causes a corresponding pulse to be produced at secondary winding 97 which raises trigger electrode 93 to a sufficient voltage to fire bulb 90 causing a discharge of the electrical energy from power source 110 between electrodes 91 and 92. The result is the production of a high intensity output light in ring bulb 90.

In accordance with conventional strobe fabrication techniques, flash control 111 includes appropriate circuitry for limiting the duration of energy discharge between electrodes 91 and 92. For example, flash control 111 may include an exposure control which monitors the returning light energy from the to-be-photographed object and interrupts the current path to ground for electrode 92 at the appropriate energy level thereby terminating the output of ring bulb 90.

With switch contact 124 of switch 121 moved to produce connection between capacitor 120 and contact 123, the system operates in substantially the same manner with the difference being the energizing of point source bulb 100 instead of ring bulb 90. Thus, with power source 110 producing a high positive voltage at electrode 101, capacitor 120 is again charged and remains charged until the operation of the shutter switch within camera 11 triggers SCR 115 causing capacitor 120 to again discharge producing a high intensity current pulse in primary winding 106 of transformer 105 which in turn energizes secondary 107 and produces a trigger pulse at trigger electrode 103 causing point source bulb 100 to discharge electrical energy from power source 110 to ground between electrodes 101 and 102.

It should be noted that the use of separate trigger transformers 95 and 105 for the operation of ring bulb 90 and point source bulb 100 respectively permits the present invention system to operate more efficiently and in a superior manner to systems using a common trigger transformer. In addition, the use of separate transformers for each of the strobe bulbs permits switch 121 to be located on the primary or low voltage side of the trigger transformers which in turn increases the life and efficiency of switch 121.

What has been shown is an improved ring and point strobe combination in which the point source is detentably positionable about the ring source to improve the performance of the strobe unit. The detent mechanism is simple and reliable and permits the strobe to be repeatedly configured in the selected configurations thereby providing reproducible photographic results.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. For use in combination with a camera having a lens defining a lens opening and shutter means for triggering a strobe unit, a ring and point strobe comprising:
   a detent housing having clamp means for attachment to a camera lens;
   a ring strobe bulb supported upon said detent housing and encircling at least a portion of the lens opening;
   a point source strobe bulb;
   a support bracket, received upon said detent housing, supporting said point source strobe bulb; and
   detent means coupled between said support bracket and said detent housing operative to detentably position said support bracket at a plurality of distinct angular positions about said ring strobe bulb.

2. A ring and point strobe as set forth in claim 1 further including limit means for limiting the angular positions of said support bracket to approximately a one hundred and eighty degree range.

3. A ring and point strobe as set forth in claim 2 wherein said detent housing defines an annular rim and wherein said support bracket defines an annular portion received upon said annular rim.

4. A ring point strobe as set forth in claim 3 further including an annular front plate supporting said ring strobe bulb and means securing said front plate to said detent housing to captivate said support bracket therebetween.

5. A ring and point strobe as set forth in claim 4 wherein said detent means include:
   a plurality of detent recesses defined in said annular portion of said support bracket; and
   a plurality of detent balls resiliently supported within said detent housing.

6. A ring and point strobe as set forth in claim 5 wherein said limit means include:
   a curved slot defined in said front plate facing said support bracket; and
   a projection extending from said support bracket and received within said curved slot.

7. A ring and point strobe as set forth in claim 1 further including:
   a power source coupled to said ring strobe bulb and said point source strobe bulb;
   first and second trigger transformers having first and second primary windings and first and second secondary windings coupled to said ring strobe bulb and said point source bulb respectively; and
   a switch selectively coupling either of said first and second primary windings to said power source to selectively trigger a selected one of said strobe bulbs.

* * * * *